United States Patent [19]
Schmidt

[11] 3,834,351
[45] Sept. 10, 1974

[54] NON-CORROSIVE, INSULATED ILLUMINATION DEVICE FOR AN AQUARIUM

[75] Inventor: Walter E. Schmidt, Winter Park, Fla.

[73] Assignee: Petcoa Industries, Inc., Toledo, Ohio

[22] Filed: Aug. 26, 1971

[21] Appl. No.: 175,294

[52] U.S. Cl.................................. 119/5, 240/2 LC
[51] Int. Cl............................................ A01k 63/00
[58] Field of Search...................... 119/5; 240/2 LC; 160/229 R; 312/138 R

[56] References Cited
UNITED STATES PATENTS

| | | | |
|---|---|---|---|
| 2,394,870 | 2/1946 | Orlin | 160/229 R |
| 3,066,645 | 12/1962 | Mulder | 119/5 |
| 3,515,097 | 6/1970 | Sherman | 119/5 |
| 3,622,777 | 11/1971 | Bovio | 119/5 X |

FOREIGN PATENTS OR APPLICATIONS

| | | | |
|---|---|---|---|
| 1,185,420 | 3/1970 | Great Britain | 119/5 |
| 802,398 | 9/1936 | France | 312/138 R |

*Primary Examiner*—Hugh R. Chamblee
*Attorney, Agent, or Firm*—Julian C. Renfro

[57] ABSTRACT

This invention relates to an illumination device which may be proportioned and constructed so as to effectively cover and illumine aquaria such as are found in homes as well as in public buildings and the like. The housing of the device and other portions which might oxidize if exposed to water are constructed of inexpensive non-corrosive material such as plastic, and other portions are of glass, so owners of salt water aquarias will find this device to be ideally suited to their needs. A fluorescent tube of the type which has been found to be beneficial to plant growth is preferably used as illumination means for providing the proper illumination for displaying the brilliant colors typically present in the tropical aquarium, which tube is shielded by a panel of glass from the water of the aquarium with which this device is used. The plastic housing, advantageously, is insulative both from the heat as well as the electrical standpoints, adding a distinct safety factor. The front portion of my device features a hinged access panel which enables the owner to easily feed and care for the fish in the aquarium, while the rear portion is fitted with removable panels so that filters, heaters, and similar types of aquarium accessories may be easily mounted in a convenient and unobtrusive portion of the aquarium.

11 Claims, 5 Drawing Figures

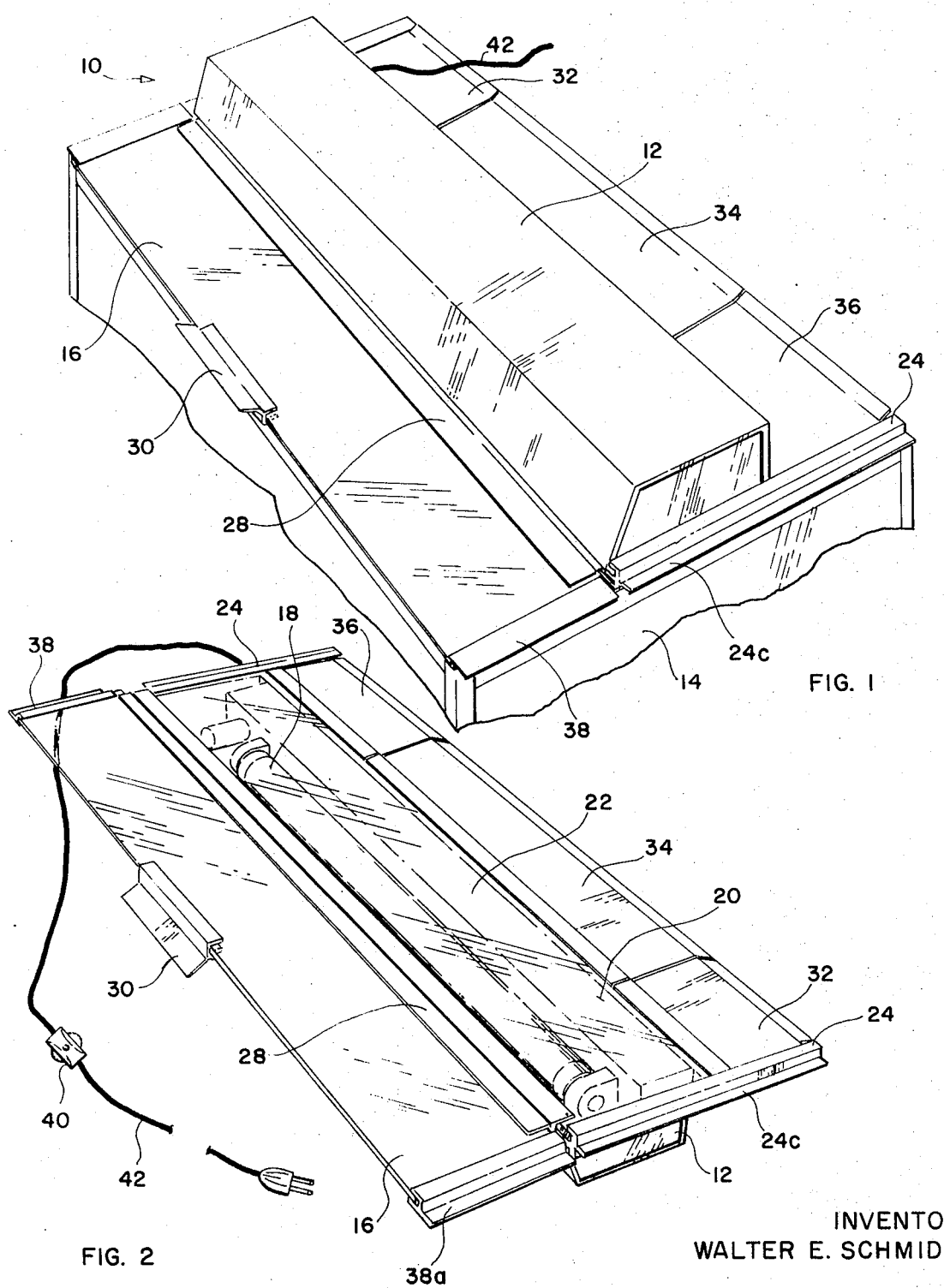

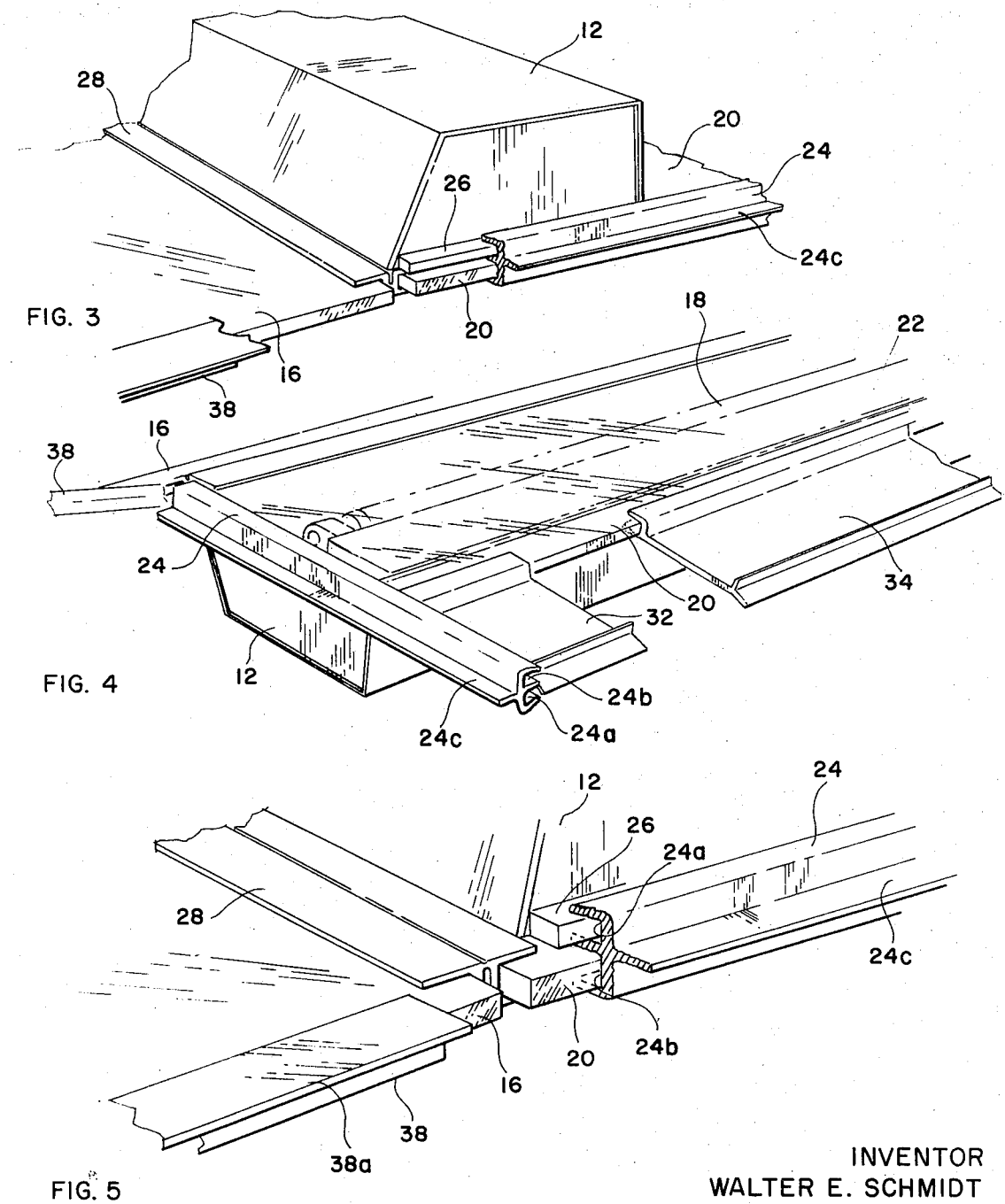

NON-CORROSIVE, INSULATED ILLUMINATION DEVICE FOR AN AQUARIUM

BACKGROUND OF THE INVENTION

1. Field of the Invention

The present invention may be regarded as being related to that class of inventions having to do with the illumination of aquaria, terraria, or the like, so that the contents of such containers can be readily displayed in public view.

The present invention is further related to that class of inventions having to do with the covering of open aquaria or the like so that plants or organisms may be contained within and protected from harmful tampering.

2. Statement of the Prior Art

In the past, a number of devices have been proposed to provide illumination for home aquaria. Most of these devices have utilized at least one incandescent bulb as a light source, which bulb necessarily operates at comparatively high temperature and produces a glare or non-uniform type of illumination. Moreover, most of the prior art devices feature a mounting arrangement for the light source which places the bulb in an exposed position perilously close to the surface of the water, so that water vaporizing from the surface or being accidently splashed may cause the hot bult to burst from the sudden contact with liquid of substantially lower temperature. Most of these devices thus present a possible source of electrical shock to the user and to some extent also endanger the aquarium life. Further, the metallic housing that conventionally shields the light source becomes quite hot in use, posing a distinct burn hazard.

Since the perfection of water filters, heaters, and other accessory equipment, hobbyists have begun to specialize in the raising of marine or salt water species to a greater extent than was previously possible. However, most of the prior art devices designed to illuminate and form a cover for salt water aquaria are subject to rapid oxidation from the action of the salt water on the many metal parts typically used in these earlier devices. Stainless steel does not corrode as does ordinary steel, but rather only discolors, but stainless steel does not adapt well to most room decors, tends to get hot from the illuminating means it encloses, and can represent a shock hazard if mounted therein is a conventional electric switch for turning on and off the bulb.

In addition to representing shock and burn hazards, as well as tending to quickly oxidize and corrode and thus incur needless expense on the part of the owner for their replacement, most of the prior art devices prove to be ill suited for use as aquaria covers since they usually have open areas through which the more active species of aquarium life may escape and die. Moreover, those devices which attempt to cope with latter problem, generally fail to provide means for conveniently attaching water filters, heaters, or similar accessories which are usually necessary to maintain a suitable environment for aquatic life.

SUMMARY OF THE INVENTION

The present invention is intended to provide an attractive, safe, practical, easily maintained, economical, and noncorrosive illumination means for a home aquarium or the like. The device is of the general type that serves as a cover for the aquaria found in many homes, and consists of a plurality of non-metallic components held in an operative relation by non-metallic means.

Basic to the invention is a fluorescent light unit which extends the length of the aquarium, extending essentially parallel with the front and rear sides of the aquarium. An electric switch in the nature of a line switch is disposed in the power cord which connects with the light unit so that the light can be turned selectively on or off at a location removed from the corrosive action of the aquarium.

The owners of aquaria in which salt water fish are kept will find that a conventional light unit rather quickly corrodes as a result of its proximity to the salt water. For that reason, the housing or shield of the instant light unit, instead of being made of metal, is made of plastic. Although the base of the lamp unit contained in the plastic housing is typically of metal, a transparent panel, preferably of glass is provided in accordance with this invention, which advantageously separates the illumination unit from the water of the aquarium. This panel also serves as a base or mounting means for certain components as will be set forth. The plastic housing or hood is formed with mounting shoulders so that trident-shaped extrusions of plastic can be utilized for clamping and holding the panel of glass and the plastic housing unit together in operative relation. On larger size devices in accordance with this invention, the housing is slidable to some extent along the extrusions, thus making it possible to move the illumination means to a forward, or to a rearward position with respect to the transparent base panel.

Other components integral to this device include a hinged front panel of glass that normally forms a cover over the front portion of the aquarium, but which can be lifted for feeding or other such purposes. The hinge for this front glass panel is also made of plastic to circumvent the corrosion problem.

The rear portion of the cover that is behind the plastic housing or shield of the lamp unit involves a plurality of plastic panels of varying sizes, each of which preferably has a formed edge of U-shaped configuration so that it can be clipped or inserted in position on the rear of the base panel such that several of these smaller panels cover the rear portion of the aquarium. One of these panels of the appropriate size can be removed at such time as it is desired to insert a bubbler unit, mount a heater, accomplish the refilling of the aquarium, etc.

In keeping with it being an object of my invention to provide a corrosion-free means of illuminating salt water aquaria or the like, I thus provide a housing or hood constructed of plastic to enclose the illumination means, which is preferably a fluorescent tube, with a panel of glass being utilized such that the metal parts of the light fixture are protected from contact with the corrosive spray. All portions of the shield or housing which might come into contact with the water, including the removable back panels and the hinged front panel, are also constructed of non-corrosive material such as glass or plastic.

In keeping with another object of this invention, which is to provide a safe and attractive illumination device, I utilize an appropriate plastic, typically black in color, in the construction of the housing member of the device, which in use becomes merely warm to the touch, and which blends with almost all room decors.

In keeping with it being yet another object of my invention to provide the owner with a means of ready access to the aquarium so that feeding, removal of debris, and other aspects of caring for the aquarium may be carried out with a minimum of trouble and disturbance to the occupants of the aquarium, I provide a hinged front panel of glass which is approximately the same length as the aquarium, so that by merely lifting this panel, the owner may readily distribute food or easily reach any part of the aquarium.

It is still another object of my invention to provide means whereby water filters, heaters, or other aquarium accessories may be attached or mounted in an inconspicuous but efficacious manner, and in keeping with the goal I provide rearwardly disposed panels of varying dimensions mounted on the transparent base panel, which may be easily removed to accommodate the desired aquarium equipment.

It is also a further object of my invention to reduce the danger of electrical shock to the owner of such device, which is accomplished by isolating the electrical switch from the vicinity of the water, by the employment of a line switch of a type which is commercially available and which is placed in the power cord connected to the lamp unit.

These and other objects, features and advantages will be more apparent from a study of the enclosed drawings in which:

FIG. 1 is a perspective view of a preferred embodiment of my novel illumination device, which may be placed upon a conventional aquarium;

FIG. 2 is a perspective view of the underside of the device shown in FIG. 1, showing the use of a transparent panel for shielding the illumination means from the moisture of the aquarium;

FIG. 3 is a fragmentary end view of my device, to a slightly larger scale in order to reveal details of the manner in which the hood member and transparent base panel are secured together;

FIG. 4 is a view of the underside of my device as viewed from the rear to show the plurality of removable panels that can be mounted on the transparent base panel; and FIG. 5 is an enlarged fragmentary view showing the hinge used to secure the front access panel to the transparent base panel.

DETAILED DESCRIPTION

Turning first to FIG. 1, it will there be seen that I have shown a novel non-corrosive illumination device 10 in accordance with my invention, involving components including a housing member or hood 12 that is preferably essentially coextensive lengthwise with a aquarium 14 upon which my device is designed to fit. A hinged access panel 16 of approximately the same length as the hood is provided on the front part of the device. The hood member 12 forms a housing or enclosure for at least one illumination means, preferably a fluorescent tube 18 as revealed in FIG. 2, which figure illustrates the underside of the device shown in FIG. 1.

FIG. 2 also reveals the use in accordance with this invention of a panel or base 20 of transparent material, which member 20 not only serves as a base or mounting means for the hood or housing 12, panel 16, and other components of my device, but also serves in a most effective way to isolate the illumination means from the moisture and spray emanating from the water contained in the aquarium. It should be noted that although the use of metal in my illumination device is held to an absolute minimum, there necessarily is some metal associated with the electrical connections to the illumination means, and perhaps even associated with bulb fixture 22, which metal is prevented from being exposed to a corrosive atmosphere by the base or panel 20. Member 20 may of course be of transparent plastic, but preferably is of 3/16 inch heavy sheet glass; see FIGS. 3–5. The front panel 16 is preferably of the same material.

Although other means should be used, I prefer to secure the hood or housing 12 to the transparent base 20 by the use of a securing means 24 in the form of an extrusion such as of PVC disposed at each end of the device, that in cross section is preferably of "E" or trident shape. A shoulder 26 on each end of the hood member as best revealed in FIG. 3 substantially coincides with adjacent edges of the transparent base member 20, and the securing means 24 serves to interconnect and fasten the hood and base members together. This is because the member-receiving slots 24a between the upper and center arms of the E are sized in a thickness sense to receive the respective shoulders 26 of the hood member, and the slots 24b between the center and lower arms of the E are sized in a thickness sense to receive opposite edges of said base plate 20. By extruding or otherwise forming the securing means to receive the shoulder and glass edge very tightly, the use of glue or cement can be obviated, although such substances may, if desired, be used.

It should be noted from FIG. 2 that the base member 20 may be of larger dimension in a front-to-rear sense than the housing member 12. Therefore, particularly in the larger sizes, it may be desirable to arrange the housing member to be slidable to some extent in its respective slots 24a, thus to make the location of the illumination means adjustable with respect to the base plate 20.

The securing means 24 may be provided with portions 24c that rest upon the top edges of the aquarium, which portions effectively prevent displacement of my illumination device from the proper position on the aquarium.

It will be noted from several of the figures of drawing, particularly FIGS. 3 and 5, that the front panel 16 is secured by a plastic hinge member 28 to the base member 20. The hinge member is provided with two recesses extending along its length, one residing on each side of the hinging portion, thus enabling the hinge member to be inserted upon the front edge of the transparent base member, and thereby form an effective means for supporting and hinging the front access panel 16. This type of hinge is of very durable plastic material that can be bent in a hinging sense at least 1,000,000 times without cracking or breaking. A lifting tab 30 having a formed edge of U-shaped configuration is inserted very tightly on the front edge of the access panel 16, so that the user or owner can easily lift the tab, hinging the front panel upward, so that fish can be fed and the aquarium cared for.

Returning to FIG. 1, it will be noticed that along the rear portion of my device are pull tabs 32, 34 and 36, which are each equipped with a formed edge of U-shaped configuration so as to frictionally yet removably fit upon the rear edge of the base member 20. These members 32, 34 and 36 respectively provide access for a heater, for filling purposes, and for the installation of a filter. Edge members 38 are tightly installed on the left and right edges of the front panel, which have portions 38a that are positioned to contact the upper side edges of the aquarium, and thus prevent the front panel 16 from dropping down too low when it is in the closed position.

In accordance with my invention, I dispense with an electric switch of the type commonly found in lights for aquaria, and instead utilize a line switch 40 for turning on and off the fluorescent bulb. This switch is installed in the line cord 42 preferably a substantial distance from the hood 12 and the aquarium 14, thus greatly diminishing shock hazard as well as the likelihood of the switch corroding.

As an example, I may make the housing or hood member of black plastic, using material 0.062 inch thick, with the shoulders being 0.140 inch high. This material blends with most room decors, and most advantageously, is insulative both in a heat sense as well as in an electrical sense.

For 20 gallon aquaria, for example, the base plate 20 can be 6¾ inch wide in a front-to-back sense, and 23½ inch long, whereas the housing member may be 22¾ inch long. A height of 1 9/16 inch and a width of 3⅛ inch may for example be standard for the housing member. As will be apparent, when as shown in FIG. 3, the base plate is larger in the front-to-back sense than the housing member 12, the housing may be movable along the securing means with respect to the base plate, to a preferred position toward the front, or toward the rear of the aquarium. Also, a pair of housing units may if desired be used on base plates that are sufficiently wide.

It should now be apparent that I have provided a most attractive, safe and effective illumination device for an aquarium, which device can be constructed in a number of different sizes, so as to fit a wide range of aquaria on the market today. Materials such as stainless steel are entirely dispensed with, as are all shock and burn hazards. The hood member 12 can be molded, or else it can be constructed from several discrete panels that are held together with an appropriate cement.

I claim:

1. A device for illuminating and covering an aquarium or the like comprising an elongate housing member, illuminating means disposed inside said housing member, a transparent base member removably secured to the underside of said housing member, with respect to which, said housing member is slidably movable, said base member and said housing member being secured in adjacent relationship by a pair of one-piece E-shaped means, each defining upper and lower slots therein, one such means being located along one pair of adjacent edges of said members, and the other such E-shaped means being located along adjacent opposite edges of said members, with opposite portions of said housing member residing in the upper slots of said means, and with opposite portions of said base member residing in the lower slots of said means, said illumination means serving to direct light through said transparent base member, said transparent base member having certain edges which may serve as mounting means for a plurality of members equipped with formed edges, at least one of such members being a hinged access panel substantially coextensive with said housing member and said base member, said hinged access panel utilizing a hinge element having a formed edge that frictionally engages said base member, said access panel being able to be lifted by the user at such time as the aquarium is to be cared for, with the lifting motion causing a manipulation of said hinge elements.

2. The device for illuminating as defined in claim 1 in which each of said one-piece E-shaped means is equipped with a lateral portion extending in the direction opposite the direction in which the arms of each E extend, said lateral portions being arranged to contact the upper edges of an aquarium with which the device is used, and forming a support for said housing member and base member.

3. A device for illuminating and covering an aquarium or the like comprising a generally rectangular hood member having closed upper portions and an open lower portion, illumination means disposed in said member and arranged to direct its illumination essentially downwardly, a transparent base member substantially coextensive with the hood member, and disposed on the underside of said hood member, securing means for removably securing said hood and base members together, said securing means being in the form of a pair of E-shaped means, each of one-piece construction and each defining slots, with opposite edges of said hood member being located in the upper slots, and with opposite edges of said base member being located in the lower slots of said E-shaped means, said base members having front and rear edges that are comparatively free, upon which certain members having formed edges may be inserted, thus to enable them to be supported by a base member, one of such members having formed edges being a flexible hinge member inserted along the front edge of said base member, said hinge member forming the support for an access panel, which access panel can be hinged upwardly out of the plane of the base member at such time as the needs of an aquarium disposed below said illumination means are to be met.

4. The device as defined in claim 3 in which the rear edge of said base panel is also free and thus available to form a means for supporting one or more members equipped with formed edges, latter members being held in place frictionally, and hence able to be easily removed from said base member at such time as access is desired.

5. The device as defined in claim 3 in which said hood member is movable with respect to said base member, along said securing means.

6. The device as defined in claim 3 in which said hood member and said hinge member are made of plastic, and said transparent base member is made of glass.

7. The device as defined in claim 3 in which said illumination means is in the form of a fluorescent tube disposed in the interior portions of hood member, an electric cord for supplying current to said fluorescent tube, and a line switch disposed in said electric cord whereby the fluorescent tube may be selectively turned on or turned off, with said line switch being disposed remote from the aquarium and any water contained therein, thus reducing shock hazards.

8. The device for illuminating and covering an aquarium as defined in claim 3, in which each of said one-piece E-shaped means is equipped with a lateral portion extending in the direction opposite the direction in which the arms of each E extend, said lateral portions being arranged to contact the upper edges of an aquarium with which the device may be used, and forming a support for said hood member and said base member.

9. A device for illuminating and covering an aquarium or the like involving a transparent base member, and a housing member slidably attached immediately adjacent said transparent base member, said housing member being adapted to contain an illumination means serving to direct at least some of its illumination through said transparent base member, and securing means for removably securing said housing member and transparent base member together, said securing means being a pair of elongate one-piece slotted members of essentially E-shaped cross section utilized at essentially opposite ends of said transparent base member, with opposite edges of said housing member being slidably received in the elongate slot disposed between the upper and center arms of the respective E, and opposite edges of said transparent base member being received in the elongate slot disposed between the center and lower arms of the respective E, each of said slotted members of essentially E-shaped cross section being equipped with a lateral portion extending in the direction opposite the direction in which said arms of each E extend, said lateral portion of each of said slotted members being arranged on occasion to contact the upper edge of an aquarium or the like used therewith.

10. A device for illuminating and covering an aquarium or the like involving a transparent base member, and a housing member slidably attached immediately adjacent said transparent base member, said housing member being adapted to contain an illumination means serving to direct at least some of its illumination through said transparent base member, and securing means for removably securing said housing member and transparent base member together, said securing means being a pair of elongate slotted members of essentially E-shaped cross section utilized at essentially opposite ends of said transparent base member, with opposite edges of said housing member being slidably received in the elongate slot disposed between the upper and center arms of the respective E, and opposite edges of said transparent base member being received in the elongate slot disposed between the center and lower arms of the respective E, the ends of the slot disposed in each of said slotted members between the upper and center arms of the E being open such that said housing member can on occasion be slid out from contact with said slotted members, and thus removed from the location immediately adjacent said transparent base member.

11. The illumination device as defined in Claim 10 in which said slotted members are of such length as to accommodate a pair of housing means upon said transparent base plate.

* * * * *